United States Patent
Zickert

(10) Patent No.: US 9,644,607 B2
(45) Date of Patent: May 9, 2017

(54) BLADE PITCH ANGLE ADJUSTING APPARATUS FOR A WIND TURBINE

(75) Inventor: Bernd Zickert, Oyten (DE)

(73) Assignee: AREVA WIND GmbH, Bremerhaven (DE)

( * ) Notice: Subject to any disclaimer, the term of this patent is extended or adjusted under 35 U.S.C. 154(b) by 635 days.

(21) Appl. No.: 13/985,557

(22) PCT Filed: Jan. 20, 2012

(86) PCT No.: PCT/EP2012/050887
§ 371 (c)(1),
(2), (4) Date: Aug. 14, 2013

(87) PCT Pub. No.: WO2012/110278
PCT Pub. Date: Aug. 23, 2012

(65) Prior Publication Data
US 2013/0330191 A1    Dec. 12, 2013

(30) Foreign Application Priority Data

Feb. 16, 2011   (EP) ..................... 11154655

(51) Int. Cl.
*F03D 7/02*    (2006.01)

(52) U.S. Cl.
CPC ........ *F03D 7/0224* (2013.01); *F05B 2240/40* (2013.01); *F05B 2260/79* (2013.01); *F05B 2260/903* (2013.01); *Y02E 10/723* (2013.01)

(58) Field of Classification Search
CPC ...... F03D 7/0224; F03D 7/024; F03D 7/0244; F03D 7/0248; F03D 7/0264; F05B 2260/903; F05B 2260/79

USPC ............... 416/32, 169 R, 147, 152–153, 155
See application file for complete search history.

(56) References Cited

U.S. PATENT DOCUMENTS

| 5,102,613 | A | * | 4/1992 | Hekmati | ............... | F16D 27/118 |
| | | | | | | 376/235 |
| 6,428,274 | B1 | | 8/2002 | Hehenberger | | |
| 6,609,889 | B1 | * | 8/2003 | Vilsboll | ............... | F03D 7/0224 |
| | | | | | | 415/4.3 |
| 2006/0208493 | A1 | | 9/2006 | Harbourt et al. | | |
| 2007/0104577 | A1 | | 5/2007 | Hansen et al. | | |

(Continued)

FOREIGN PATENT DOCUMENTS

| CN | 101326363 A | 12/2008 |
| CN | 201187405   | 1/2009 |

(Continued)

*Primary Examiner* — Thai Ba Trieu
*Assistant Examiner* — Mickey France
(74) *Attorney, Agent, or Firm* — Davidson, Davidson & Kappel, LLC

(57) ABSTRACT

A wind turbine blade pitch angle adjusting apparatus for adjusting the pitch angle of a blade of a wind turbine is provided. The apparatus includes an electric pitch motor able to output a maximum motor torque Tm and a pitch brake assembly able to generate a maximum brake assembly torque Tb. The pitch brake assembly includes a plurality of individual pitch brakes each able to generate a maximum individual brake torque Tsb, the maximum brake assembly torque Tb is the sum of all maximum individual brake torques Tsb, and the maximum motor torque Tm is higher than the maximum individual brake torque Tsb of any one of the pitch brakes.

9 Claims, 1 Drawing Sheet

(56) References Cited

U.S. PATENT DOCUMENTS

| | | | | |
|---|---|---|---|---|
| 2010/0314875 A1* | 12/2010 | Grant | ............... | F03D 7/0212 |
| | | | | 290/44 |
| 2011/0211961 A1* | 9/2011 | Nies | ............... | F03D 7/0204 |
| | | | | 416/169 R |
| 2012/0063900 A1* | 3/2012 | Kestermann | ......... | F03D 7/0224 |
| | | | | 416/147 |

FOREIGN PATENT DOCUMENTS

| | | | | |
|---|---|---|---|---|
| CN | 101915211 A | 12/2010 | | |
| DE | 102009025819 A1 * | 11/2010 | ........... | F03D 7/0224 |
| DE | WO 2010133444 A2 * | 11/2010 | ........... | F03D 7/0224 |
| JP | 2010-270733 A | 12/2010 | | |
| RU | 2354845 | 5/2009 | | |
| WO | WO 99/23384 | 5/1999 | | |
| WO | WO 00/09885 | 2/2000 | | |
| WO | WO 00/61942 | 10/2000 | | |

\* cited by examiner

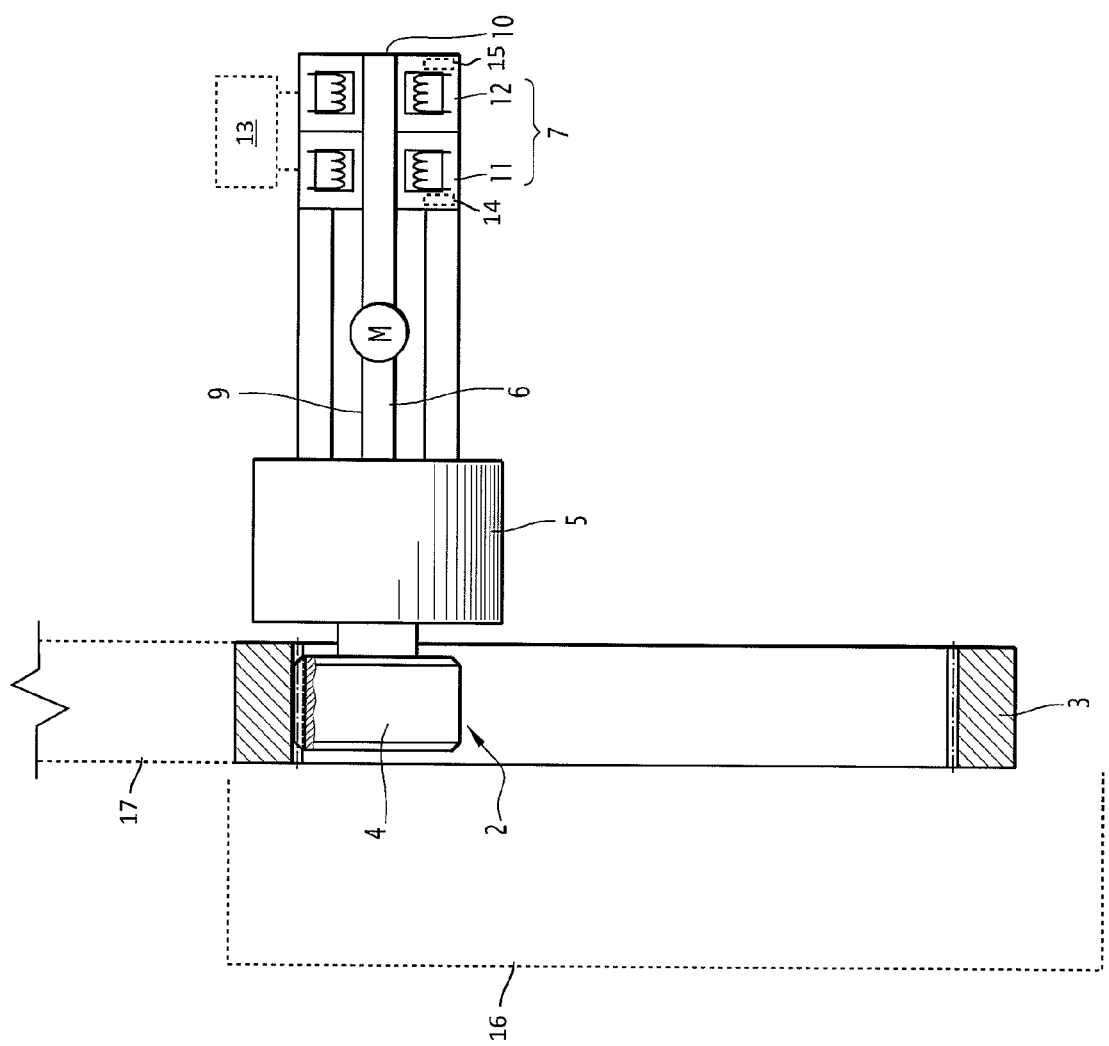

BLADE PITCH ANGLE ADJUSTING APPARATUS FOR A WIND TURBINE

The present invention pertains to a wind turbine blade pitch angle adjusting apparatus for adjusting the pitch angle of a blade of a wind turbine, comprising an electric pitch motor able to output a maximum motor torque Tm, and a pitch brake assembly able to generate a maximum brake assembly torque Tb.

BACKGROUND

Pitch control systems having blade pitch angle adjusting apparatuses are known from the state of the art.

In these systems, each rotor blade is pitched individually with a dedicated blade pitch angle adjusting apparatus, namely an electromechanical actuator. Each such actuator comprises an electric pitch motor, a reducer and an electromagnetic pitch brake.

By default, the pitch brake is in a braking condition. In order to adjust the pitch angle, the pitch brake is released, and the pitch motor drives the blade in a rotary motion around its longitudinal axis. When reaching the desired pitch angle, the pitch brake returns to its default braking condition and stops the rotating blade.

Such a blade pitch angle adjusting apparatus has the drawback that the pitching of the blade is no longer possible when the pitch brake fails. When such a failure occurs, the pitch brake cannot be released and consequently the pitch motor operates against a closed brake. This can cause an overload to the motor's electric circuit and damage the motor. In any case, the pitch motor is unable to turn the blade. Accordingly, the wind turbine looses its pitching capability, can no longer adapt to varying wind conditions, and risks to be subjected to dangerously high loads caused by aerodynamic imbalances.

A solution to this problem is to provide the blade pitch angle adjusting apparatus with a high power pitch motor that is able to overcome the braking force of the pitch brake in case of brake failure. However, this solution is not satisfying since it increases the size, cost and weight of the pitch motor.

Document RU 2 354 845 C1 discloses a blade pitch angle adjusting apparatus which, instead of having an electric pitch motor, exploits the kinetic energy of the wind turbine for pitching.

SUMMARY OF THE INVENTION

An object of the present invention is therefore to provide a blade pitch angle adjusting apparatus of small size, low weight and low cost that is able to adjust blade pitch even in case of pitch brake failure.

This object may be achieved by a wind turbine blade pitch angle adjusting apparatus for adjusting the pitch angle of a blade of a wind turbine, comprising an electric pitch motor able to output a maximum motor torque Tm, and a pitch brake assembly able to generate a maximum brake assembly torque Tb, characterised in that the pitch brake assembly comprises a plurality of individual pitch brakes each able to generate a maximum individual brake torque Tsb, the maximum brake assembly torque Tb is the sum of all maximum individual brake torques Tsb, and the maximum motor torque Tm is higher than the maximum individual brake torque Tsb of any one of the pitch brakes.

By providing a pitch brake assembly with several individual pitch brakes, the total braking force and the risk of pitch brake failure are distributed over several brakes instead of one. If one of the individual pitch brakes fails the pitch motor only has to overcome the partial braking force of this individual pitch brake for pitching. Hence, the pitch motor can be kept smaller than in the prior art solution using a high power pitch motor.

According to preferred embodiments, the apparatus of the invention has one or several of the following features, taken in isolation or in all technically possible combinations:
the maximum brake assembly torque Tb is higher than the maximum motor torque Tm;
means for controlling the pitch brakes to brake jointly;
each of the pitch brakes is a self contained brake unit with its own power supply;
the pitch brake assembly consists of two pitch brakes;
the maximum individual brake torque Tsb of each pitch brake is half the maximum brake assembly torque Tb of the pitch brake assembly;
a drive shaft connected to the pitch motor and the pitch brake assembly in order to be driven by the pitch motor and braked by the pitch brake assembly;
a reduction gear connected to the pitch motor.

The invention also relates to a wind turbine comprising a rotor, the rotor comprising a hub, at least one blade rotatably mounted on the hub about a pitch axis for adjusting the pitch angle of the blade, and a blade pitch angle adjusting apparatus for adjusting the pitch angle of the blade as defined above.

BRIEF DESCRIPTION OF THE DRAWINGS

The invention will be better understood when reading the following description of a non limiting example of the invention, with reference to the accompanying FIGURE, which is a schematic side view of a blade pitch angle adjusting apparatus according to the invention.

DETAILED DESCRIPTION

With reference to the FIGURE, there is shown a blade pitch angle adjusting apparatus 1. This apparatus is located in a rotor hub 16 (schematically shown) of a wind turbine. One end 2 of the apparatus 1 is in meshing engagement with a ring gear 3. The ring gear 3 is fixed to the lower end of a rotor blade 17 (schematically shown). The ring gear 3 and the rotor blade 17 are rotatable with respect to the rotor hub 16 about a pitch axis corresponding substantially to a longitudinal axis of the rotor blade 17.

The blade pitch angle adjusting apparatus 1 comprises, from the FIGURE'S left to the right, a pinion 4, a reduction gear 5, a drive shaft 6, an electric pitch motor M, and a pitch brake assembly 7.

Pitch motor M is able to output a maximum motor torque Tm.

The drive shaft 6 is connected to the motor M so as to be driven by the motor M and has a driving end 9 and a braking end 10. The driving end 9 is connected to the reduction gear 5, which in turn is connected to the pinion 4. The pinion 4 is in meshing engagement with the ring gear 3.

In the shown example, the pitch brake assembly 7 comprises two individual pitch brakes 11 and 12. If desired, the pitch brake assembly 7 could comprise more than two individual pitch brakes. In the shown example, the pitch brakes 11 and 12 surround the braking end 10 of the motor shaft 6 and are arranged next to each other. However, pitch brakes 11 and 12 may also be arranged between the pitch motor M and the reduction gear 5. Another possible arrangement is to have one of the pitch brakes between the pitch motor M and the reduction gear 5, while the other pitch brake is located at the braking end 10. The advantage of having a pitch brake between the motor M and the reduction gear 5 is that the rotor blade 17 can be kept locked in position during a replacement of motor M.

Pitch brakes 11, 12 are of the self-locking type, which means that, by default, pitch brakes 11, 12 are in a braking condition.

Each pitch brake 11, 12 is a self contained brake unit with its own power supply 14, 15 (schematically shown), respectively. Accordingly, each pitch brake 11, 12 is able to function independently from the other. In particular, pitch brake 11 is able to operate even in case of failure of pitch brake 12 and vice versa. Preferably, pitch brakes 11 and 12 are electromagnetic brakes. In another embodiment, not shown, the pitch brakes are hydraulic brakes.

The blade pitch angle adjusting apparatus 1 also comprises means 13 (schematically shown) for controlling the pitch brakes 11, 12 to behave as a single pitch brake.

Each pitch brake 11, 12 is able to generate a maximum individual brake torque Tsb (Tsb1 and Tsb2, respectively). Accordingly, the pitch brake assembly 7 is able to generate a maximum brake assembly torque Tb=Tsb1+Tsb2. In the present example, Tsb1=Tsb2 such that Tb=2*Tsb1=2*Tsb2.

In an alternative embodiment, Tsb1=2*Tsb2 such that Tsb2=Tb/3 and Tsb1=2*Tb/3.

The pitch motor M and the pitch brakes 11, 12 are chosen such that Tb>Tm>Tsb.

Normal Pitching Operation

The blade pitch angle adjusting apparatus 1 operates in the following manner in order to adjust the pitch of the associated rotor blade 17:

Firstly, the pitch brake control means 13 provides power to both individual brakes 11, 12 concurrently in order to release the pitch brake assembly 7. Then, the pitch motor M is energised and drives the drive shaft 6. Hence, via the reduction gear 5, the pinion 4 rotates, which leads to a rotation of the ring gear 3 and the attached rotor blade 17. When the desired pitch angle is reached, the pitch motor M stops and the pitch brake control means 13 deactivates both individual brakes 11, 12 in order to brake the drive shaft 6 and hence the rotor blade 17.

Under normal pitching operations, the control means 13 controls the pitch brakes 11, 12 in such a manner that they operate as a single pitch brake. The control means 13 controls the pitch brakes 11, 12 in a synchronous manner.

Pitching Operation in Case of Pitch Brake Failure

If one of the individual brakes 11, 12 fails and thus cannot be released, the pitch motor M, thanks to its maximum motor torque Tm that is higher than the maximum individual brake torque Tsb, overcomes the failed individual brake's braking force and pitches the wind blade into the safe feather position in order to avoid damage to the wind turbine. The remaining pitch brake can be released to allow pitching the rotor blade 17. Meanwhile the rotor blade 17 can be maintained reliably in the desired position upon deactivating the said remaining pitch brake 11, 12.

Since the likelihood of simultaneous failure of both independent brakes 11, 12 is negligible the pitch motor M only needs sufficient power to overcome the partial braking force of one failed individual brake. Accordingly, the pitch motor M can have a compact size without jeopardising the wind turbine's security.

What is claimed is:

1. A wind turbine blade pitch angle adjusting apparatus for adjusting the pitch angle of a blade of a wind turbine, comprising:
    an electric pitch motor able to output a maximum motor torque Tm; and
    a pitch brake assembly able to generate a maximum brake assembly torque Tb, the pitch brake assembly including a plurality of individual pitch brakes each able to generate a maximum individual brake torque Tsb, the maximum brake assembly torque Tb being the sum of all maximum individual brake torques Tsb, and the maximum motor torque Tm being higher than the maximum individual brake torque Tsb of any one of the pitch brakes.

2. The apparatus as recited in claim 1 wherein the maximum brake assembly torque Tb is higher than the maximum motor torque Tm.

3. The apparatus as recited in claim 1 further comprising a controller for controlling the pitch brakes to brake jointly.

4. The apparatus as recited in claim 1 wherein each of the pitch brakes is a self contained brake unit with its own power supply such that each brake functions independently from the other.

5. The apparatus as recited in claim 1 wherein the pitch brake assembly consists of two pitch brakes.

6. The apparatus as recited in claim 5 wherein the maximum individual brake torque Tsb of each pitch brake is half the maximum brake assembly torque Tb of the pitch brake assembly.

7. The apparatus as recited in claim 1 further comprising a drive shaft connected to the pitch motor and the pitch brake assembly in order to be driven by the pitch motor and braked by the pitch brake assembly.

8. The apparatus as recited in claim 1 further comprising a reduction gear connected to the pitch motor.

9. A wind turbine comprising:
    a rotor, the rotor comprising:
        a hub,
        at least one blade rotatably mounted on the hub about a pitch axis for adjusting the pitch angle of the blade, and
        the blade pitch angle adjusting apparatus as recited in claim 1 for adjusting the pitch angle of the blade.

* * * * *